MICHAEL O. FELIX
INVENTOR.

BY Stuart Lubitz
ATTORNEY

MICHAEL O. FELIX
INVENTOR.

BY Stuart Lubitz
ATTORNEY

April 2, 1968 M. O. FELIX 3,376,383
RECORDER HAVING OFFSET HEADS TO RECORD SYNC PULSES IN LINE
FOR CROSSTALK REDUCTION
Filed April 8, 1964 3 Sheets-Sheet 3

MICHAEL O. FELIX
INVENTOR.
BY Stuart Lubitz
ATTORNEY

United States Patent Office 3,376,383

Patented Apr. 2, 1968

3,376,383

RECORDER HAVING OFFSET HEADS TO RECORD SYNC PULSES IN LINE FOR CROSSTALK REDUCTION

Michael O. Felix, San Carlos, Calif., assignor to Ampex Corporation, Redwood City, Calif., a corporation of California Filed Apr. 8, 1964, Ser. No. 358,208
3 Claims. (Cl. 178—6.6)

ABSTRACT OF THE DISCLOSURE

A rotary head magnetic tape recording system for minimizing crosstalk between recorded adjacent parallel tracks extending transversely of the tape. A pair of magnetic heads are located on different diameters of the rotary head drum offset by a distance for which the horizontal sync pulses of a video signal recorded by the heads on adjacent tracks are aligned in a direction perpendicular to the tracks.

This invention relates to a recording apparatus and method and more particularly to a means for recording information in a manner to achieve improved reproduction of the recorded information.

The invention is discussed with reference to the recording of video information on a magnetic medium by a rotary head type recorder (such as an Ampex Videotape Machine). It should be understood that the principle and essence of the invention may be readily applied to other types of signal information such as instrumentation data and to other recorders and recording medium.

To date all successful television tape recorders have used a scanning system in which the recorded tracks are placed in a side by side relationship. These prior art recorders may or may not include recording medium moving in a helical path and a video field per recorded track. In designing such television recorders it has become common practice to select drum diameter, drum or head speed and tape speed to accomplish the desired recording. The product of the head to tape speed and the tape speed is indicative of the economic utilization of the tape. The lower the product the better the utilization. The lowest useable head to tape speed is set by the smallest recordable wavelength and by the highest frequency of the input signal. The lowest tape speed is controlled by the minimum track width or spacing which depends largely on the required signal-to-noise ratio and the tracking accuracy of the head servo system. Once the head-tape speed is selected, the drum diameter is limited primarily by the video field rate since it is desirable that one field be recorded on each track. It can be seen that the design of a television recorder involves a compromise of frequency response, tape utilization, economics, and overall performance in an environment of existing television standards. Inventions which minimize this compromise have long been sought.

In a typical prior art television recorder (such as the Ampex VR–1500) designed with the above considerations in mind, a two inch magnetic medium or tape is moved in a 180° helical path at a rate of 3.5–3.7 inches per second over a rotating head assembly which rotates with a relative peripheral speed of 640–650 inches per second. The head assembly contains two ferrite type heads mounted on a drum and adapted to lightly contact the tape. The heads are placed on a common diameter which lies in a plane substantially perpendicular to the axis of rotation of the drum.

The movement of the heads and the tape relative to one another results in the recording of a transverse track of information across the magnetic tape such as is shown in FIGURE 1A. A field of video information is contained in each transverse track such as track 1. A working field comprises 240 lines of video information while a full field comprises 262½ lines of information. The adjacent track such as track 2 in FIGURE 1A similarly contains 262½ lines of video information and together with the field recorded on track 1 comprises a frame of 525 lines or a frame of 480 working lines. In FIGURE 1A and 1C a line of video information is schematically represented as a rectangle such as 4. A horizontal sync pulse is located at the beginning of each video line and it is represented in the figure by a short rectangle such as 6. The number of blocks shown are for illustrative purposes only and not intended as an exact representation.

In a helical path arrangement (such as the Ampex VR–1500) the minimum tape speed that may be practically used to accomplish acceptable performance is about 3.5 inches per second. At this speed the first sync pulse on each track is placed on a common reference line such as the broken line 8 (FIGURE 1A) parallel with the edge of the video track as defined by the broken line 10.

With the format described above the video information signal on one track overlaps the video information on the adjacent track. More particularly when a recorded video line on one track is projected in a direction perpendicular to the track and towards the recorded video line on the adjacent track there is an overlap recorded (see FIGURES 1A and 1B). The significance of this can be appreciated when one considers a rotating head moving between two tracks either intentionally or because of some misalignment. In this situation the information recorded as shown in FIGURES 1A and 1B, on one track will tend to interfere or contradict the information recorded on the adjacent track. This interference or crosstalk arises from the fact that the information on one portion of a video line is likely to be distinct from the video information on a different portion of the video line in the next field or adjacent track. In terms of the video picture the recorded line causing the crosstalk is the adjacent video line in the interlaced frame.

The relationship between the adjacent recorded lines is shown in FIGURE 1B which is an enlarged view of a portion of FIGURE 1A. Referring to FIGURE 1B when the heads are moved between track 1 and track 2 or across the tracks, the active transducer or head may pick up the video information signal 12 and the sync signal 14 at the same time resulting in a loss of information or synchronization.

From the above description it can be seen that if the recorded information were properly aligned the video information (and sync pulses) on one track would tend to coincide with the information on the adjacent track resulting in a minimum of deterioration of the transduced video information. Such an improved arrangement is schematically shown in FIGURES 1C and 1D. The effectiveness of this technique depends upon the similarity of adjacent lines in the two fields that make up the video frame. Generally the adjacent lines are close to identical.

The alignment of video information and sync pulses as shown in FIGURES 1C and 1D is particularly advantageous when the tape has stopped and is then scanned by the rotating head (hereinafter referred to as stop motion transmission). In this situation the rotating head moves across a plurality of recorded tracks but in spite of this satisfactory picture quality is maintained. The same results are achieved when the tape is moving at a speed slower than the recording speed (hereinafter referred to as slow motion transmission).

The above advantages of sync pulse alignment were recognized by F. T. Backers and J. H. Wissels in article "An Experimental Apparatus for Recording Television Signals on Magnetic Tape," Phillips Technical Review, vol. 24, No. 3, pages 81–83 (1962).

It can be seen from the above that to accomplish sync pulse alignment is desirable, but to do so by compromising the mentioned design considerations is not acceptable. To accomplish the alignment by varying the drum diameter, drum speed and tape speed in a machine such as the Ampex VR–1500 would result in tape speeds of about 3 i.p.s., 5 i.p.s. or 7 i.p.s. The 3 i.p.s. speed is not compatible with signal-noise considerations while the 5 i.p.s. would result in undue tape consumption.

One aspect of the invention is to avoid the disadvantages that accompany further compromising system parameters and still obtain the advantages of the arrangement shown in FIGURES 1C and 1D. The invention accomplishes this by the simple, surprising and effective means of staggering or offsetting the head spacing on the rotating drum. The proper spacing of the heads results in information recorded as shown in FIGURE 1C. Typically in the Ampex VR–1500 one head is offset from the usual common diameter by a circumferential distance equivalent to the distance represented by the product of head speed and the time necessary to record or transmit ½ (one-half) a video line or an odd multiple of video lines thereof. This spacing enables a tape speed of about 3.7–4.2 i.p.s. to be utilized. This speed results in no deterioration of the signal to noise ratio and in acceptable tape consumption.

A broad aspect of the invention is the utilization of head staggering as a variable factor in recorder system design and more particularly in the design of video recording systems. The recognition of head spacing as a variable factor gives rise to significant advantages. For example it enables other system parameters to be changed to more effectively or efficiently attain high performance recording.

The object of this invention is to provide an improved apparatus and method for recording information on adjacent tracks;

Another object of this invention is to provide a means for greater flexibility in the design of rotary head recorders;

Another object of this invention is to provide an apparatus and method for recording information in such a manner as to minimize crosstalk;

Another object of this invention is to provide an improved apparatus for recording video information so that misalignment of a rotating head with the track does not significantly deteriorate the video picture;

Another object of this invention is to provide an improved apparatus and method for recording video information that enables acceptable slow motion transmission and stop motion transmission to be achieved;

These and other objects and advantages will be more fully appreciated when the detailed description is taken in conjunction with the drawings wherein.

Figure 2:
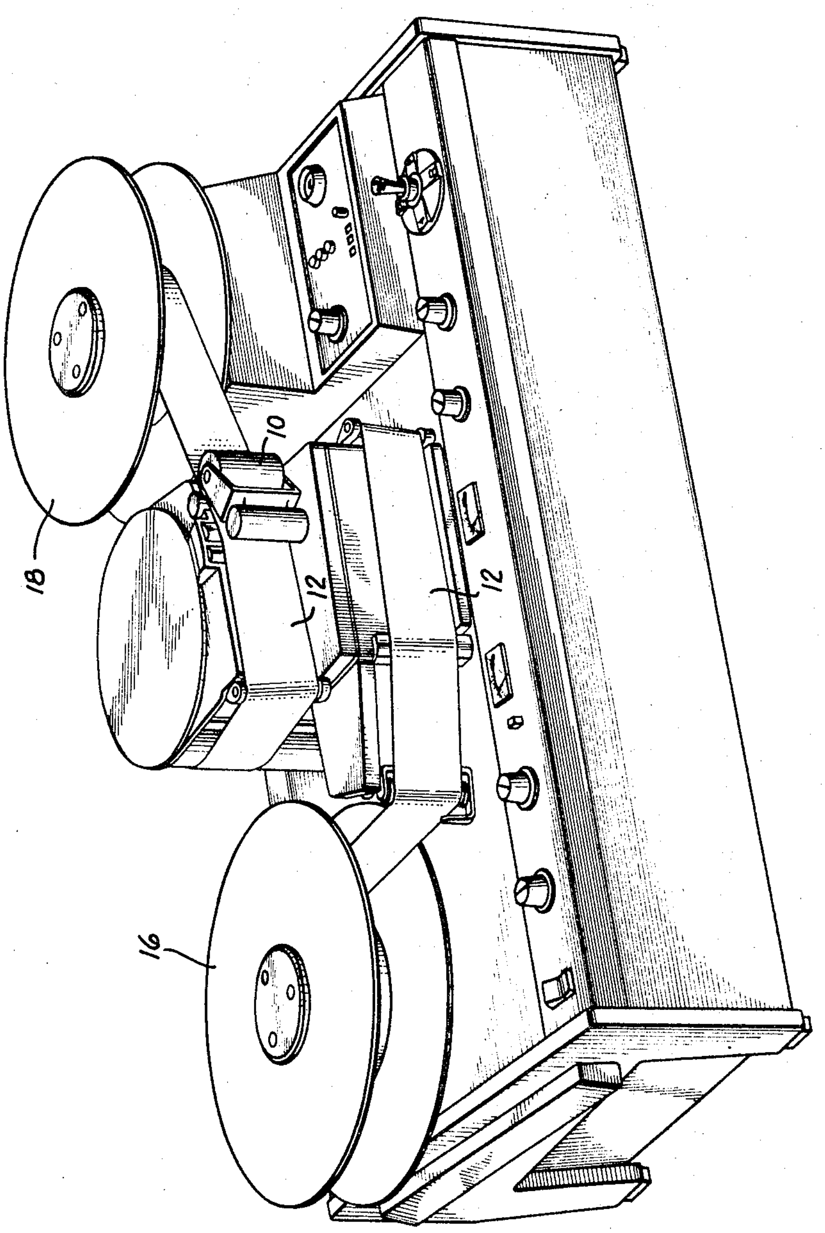
FIGURE 2 is a perspective of a video recording machine that utilizes the invention.
Figure 3:
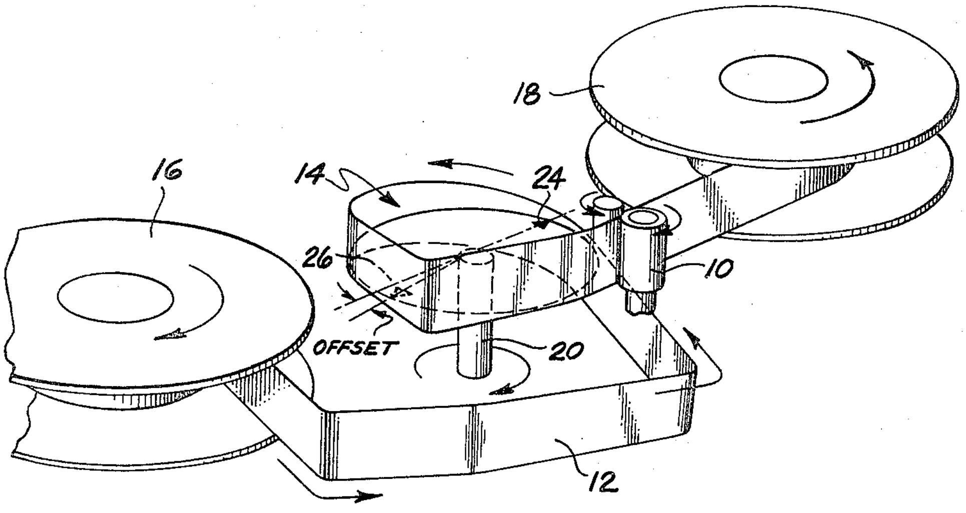
FIGURE 3 is a perspective showing of a magnetic drum-tape arrangement.
Figure 4:
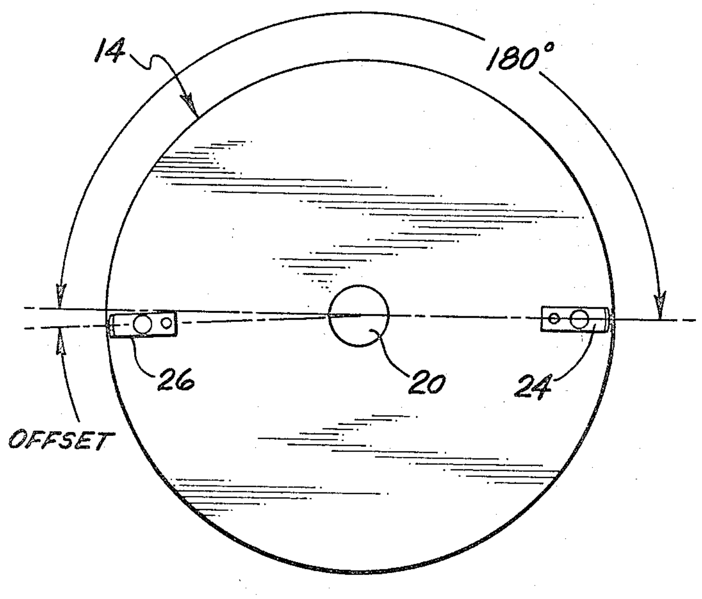
FIGURE 4 is an enlarged view of the head configuration showing the staggered spacing of the heads.

FIGURES 2 and 3 show a portion of a rotary recording machine. The details of such a machine are set forth in the publication, Ampex VR–1500 Portable Videotape Recorder, published by Ampex Corporation in 1963 and in pending U.S. patent application 291,137 by John Streets and filed June 27, 1963. In FIGURE 2 the recording medium transports means comprises the capstan 10 which drives the recording medium 12 in a 180° helical path around the transducer carrying means or drum 14. The recording medium 12 is stored on a supply reel 16 and a takeup reel 18 which generally have independent driving means.

The transducer carrying means 14 may take the form of any of the well known rotary head arrangements such as the ones described in "Videotape Recording" by Julian L. Burnstein, published in July 1960 by John F. Rider, Publishing Inc., chapter 6 or in U.S. Patent 3,114,513 issued to Takushi Yasuda et al. on Dec. 17, 1963. The transducer carrying means 14 has separate driving means (not shown) connected to the shaft 20 which is controlled by a servo mechanism. The transducer carrying means 14 is ideally driven at a constant selected speed while the recording medium 12 is similarly driven at a constant speed in close proximity and synchronized with the transducer carrying means 14.

The transducer carrying means 14 is shown in greater detail in FIGURE 3 and comprises a drum 22 which may be made from brass or aluminum. The drum 22 carries a plurality of transducer means 24 and 26. A typical transducer means that may be used is shown in U.S. patent application 103,424 invented by Robert F. Pfost and filed on Apr. 17, 1961. Typically the transducer means 24 and 26 includes ferrite and alfesil cores having non-magnetic transducing gaps. The signals to be recorded on the recording medium 12 are applied to the transducer means 24 and 26 by coils wound about the cores and energized via a brush or rotary transformer arrangement.

Figures 1A, 1B:
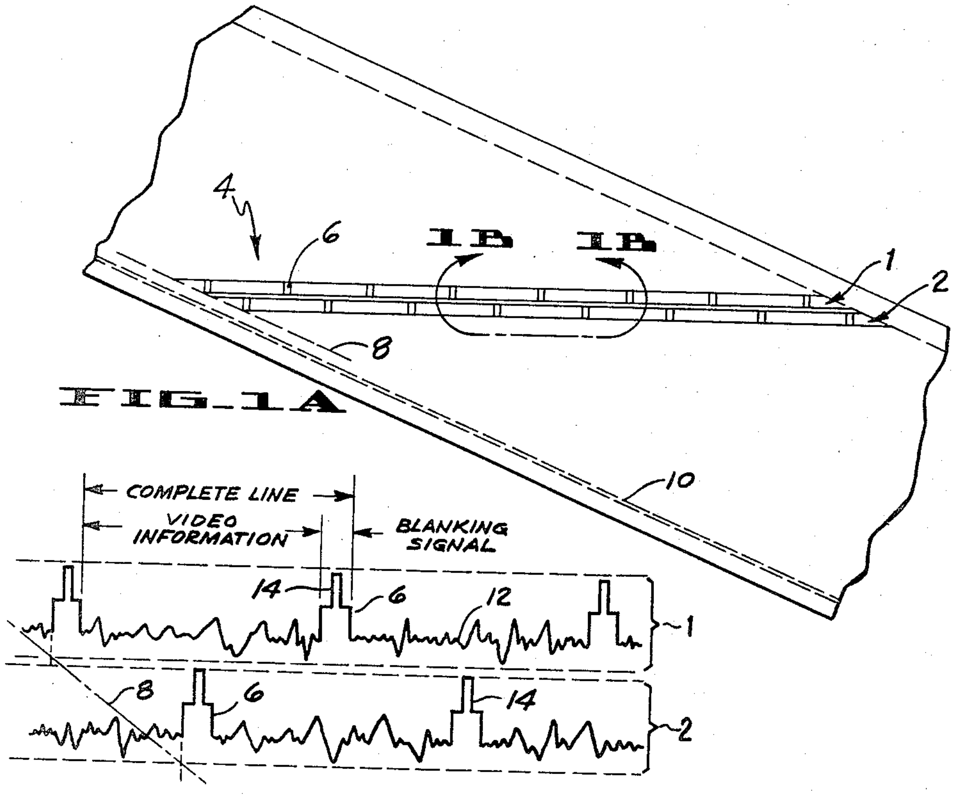
FIGURE 1 is a schematic showing of the format for recorded video information as is present in the prior art and as is used in the invention.
Figure 1C:
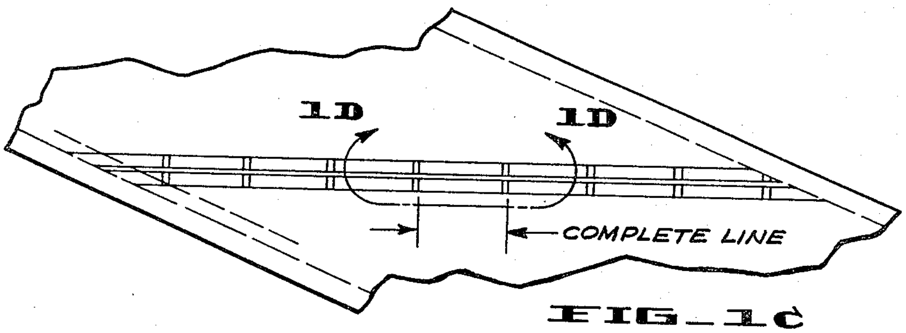
Figure 1D:
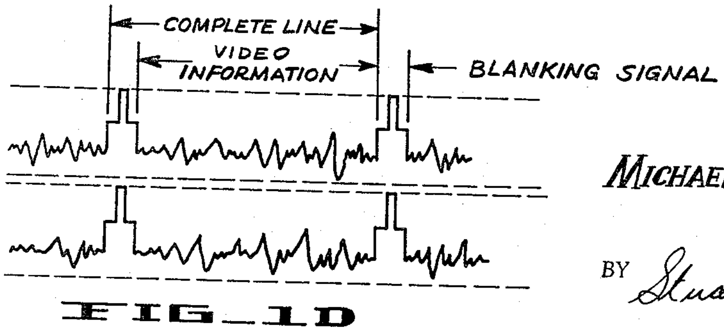

It should be noted that the transducer means 24 and 26 do not lie on the same diameter. The transducer 26 is staggered or offset from the diameter on which transducer means 24 is placed so that it contacts the medium 12 in a time that enables the alignment shown in FIGURES 1C and 1D. It has been found that a circumferential offset distance equivalent to the product of the head speed and the time required to record or transmit one-half a video line or an odd multiple thereof is desirable in such machines as the Ampex VR–1500. In angular displacement this amounts to 0.28 degree on an 8.01 inch drum diameter. An alternate method for computing the head spacing is by geometric techniques. The recording drum in the Ampex VR–1500 has a circumference that is approximately equal to the length of two recorded tracks. This circumference may be divided or segmented into 625 recorded lines (assuming continental television standards) and then the head may be offset ½ (one-half) of a segment or as required. The exact offset may vary from system to system but these principles of offset computation would in general remain valid.

The transducer means 24 and 26 may be located in the same plane which is substantially perpendicular to its axis of rotation of the shaft 20. In operation of the transducer means 24 may be switched to reproduce 263 lines along one track while the transducer means 26 is switched to reproduce only 262 lines along the next track. These tracks may be considered to comprise a plurality of discrete segments containing a video line or other logically related information.

In a typical two headed helical scan system utilizing the staggered head arrangement the following system parameters may be utilized:

| Elements: | Values of the elements |
|---|---|
| Drum diameter | 8.01 inches. |
| Offset of transducer means **26** | 17 minutes, 2 seconds (.28 degrees). |
| Tape speed | 4.117 inches per second. |
| Static helix angle | 7°, 35 minutes, 31 seconds. |
| Dynamic helix angle | 7°, 32 minutes, 36 seconds. |
| Writing speed | 637.9 inches per second. |
| Width of video information | 1.675 inches. |
| Video track spacing | .0108 inch. |
| Cycles | 50 c.p.s. |

Utilizing the above dimensions in the Ampex VR–1500 system has resulted in improved performance, improves stop motion transmission and enabled slow motion video picture reproduction. It should be understood that the invention is particularly well suited for systems having an even number of transducer pairs.

While the above detailed description has shown, described and pointed out the fundamental novel features of the invention as applied to a preferred embodiment, it will be understood that various omissions and substitutions and changes in the form and details of the device and method illustrated may be made by those skilled in the art, without departing from the spirit of the invention. It is the intention, therefore, to be limited only as indicated by the scope of the following claims.

What is claimed is:

1. In a recording system, the combination comprising:
recording medium;
transducer carrying means for supporting and for rotating a plurality of transducers at a given speed;
medium transport means for moving said recording medium at a given speed in close proximity with said transducer carrying means;
pair of transducers located on said transducer carrying means;
one of said transducers located on a first diameter and the second of said transducers located on a second diameter offset from said first diameter a distance equivalent to head speed multiplied by the time necessary to record one half of a video line of a video signal to be recorded by said transducers or an odd multiple thereof.

2. In a recorder having a plurality of heads and a recording medium, the method of recording signals divided into discrete segments and recorded on adjacent transverse tracks, the steps comprising:
moving the recording medium and the recording heads at a given relative speed;
applying discrete signals to the heads; and
locating the heads relative to one another so that a perpendicular projection of a recorded discrete segment from one track has its commencing and terminating portions in alignment with the terminating and commencing portion of a recorded discrete segment on the adjacent track.

3. In a recorder having a plurality of heads and a recording medium, the method of recording signals divided into discrete segments and recorded on adjacent transverse tracks, the steps comprising:
moving the recording medium and the recording heads at a relative speed;
applying discrete signals to the heads to record a plurality of tracks; and
locating the heads in offset relationship relative to one another so that a perpendicular projection of a recorded discrete segment from one track has its commencing and terminating portions in alignment with the terminating and commencing portion of a recorded discrete segment on the adjacent track.

References Cited

UNITED STATES PATENTS

| | | | |
|---|---|---|---|
| 3,234,325 | 2/1966 | Backers | 178—6.6 |
| 3,235,670 | 2/1966 | Kihara | 178—6.6 |

ROBERT L. GRIFFIN, *Primary Examiner.*

JOHN W. CALDWELL, *Examiner.*

H. W. BRITTON, *Assistant Examiner.*